United States Patent [19]

Galloway et al.

[11] Patent Number: 5,359,686
[45] Date of Patent: Oct. 25, 1994

[54] INTERFACE FOR COUPLING OPTICAL FIBERS TO ELECTRONIC CIRCUITRY

[75] Inventors: David Galloway, Tempe; Michael S. Lebby, Apache Junction, both of Ariz.

[73] Assignee: Motorola, Inc., Schaumburg, Ill.

[21] Appl. No.: 38,375

[22] Filed: Mar. 29, 1993

[51] Int. Cl.$^5$ .............................................. G02B 6/42
[52] U.S. Cl. ........................................ 385/49; 385/37; 385/50; 385/89
[58] Field of Search .................... 385/15, 37, 39, 49, 385/50, 59, 71, 88, 89

[56] References Cited

U.S. PATENT DOCUMENTS

| | | | |
|---|---|---|---|
| 5,028,110 | 7/1991 | Plummer | 385/39 X |
| 5,062,681 | 11/1991 | Furmanak et al. | 385/50 |
| 5,230,030 | 7/1993 | Hartman et al. | 385/50 |

*Primary Examiner*—John D. Lee
*Attorney, Agent, or Firm*—Eugene A. Parsons

[57] ABSTRACT

An optical interface including a base with molded optical waveguides and overmolded electrical conductors, with a keyway formed therein. A keyway mating portion molded around the ends of a plurality of optical fibers to expose the ends of the fibers. With the keyway mating portion engaged in the keyway, openings in a surface of the keyway communicate light to/from the fibers, through the optical waveguides, from/to semiconductor devices on the base. The keyway accurately aligns the mating portion which aligns the ends of the fibers with the openings and, hence, the optical waveguides. Two different waveguide molding techniques are used and diffraction gratings are used to introduce and/or receive light from the ends or mid-points of the waveguides.

37 Claims, 7 Drawing Sheets

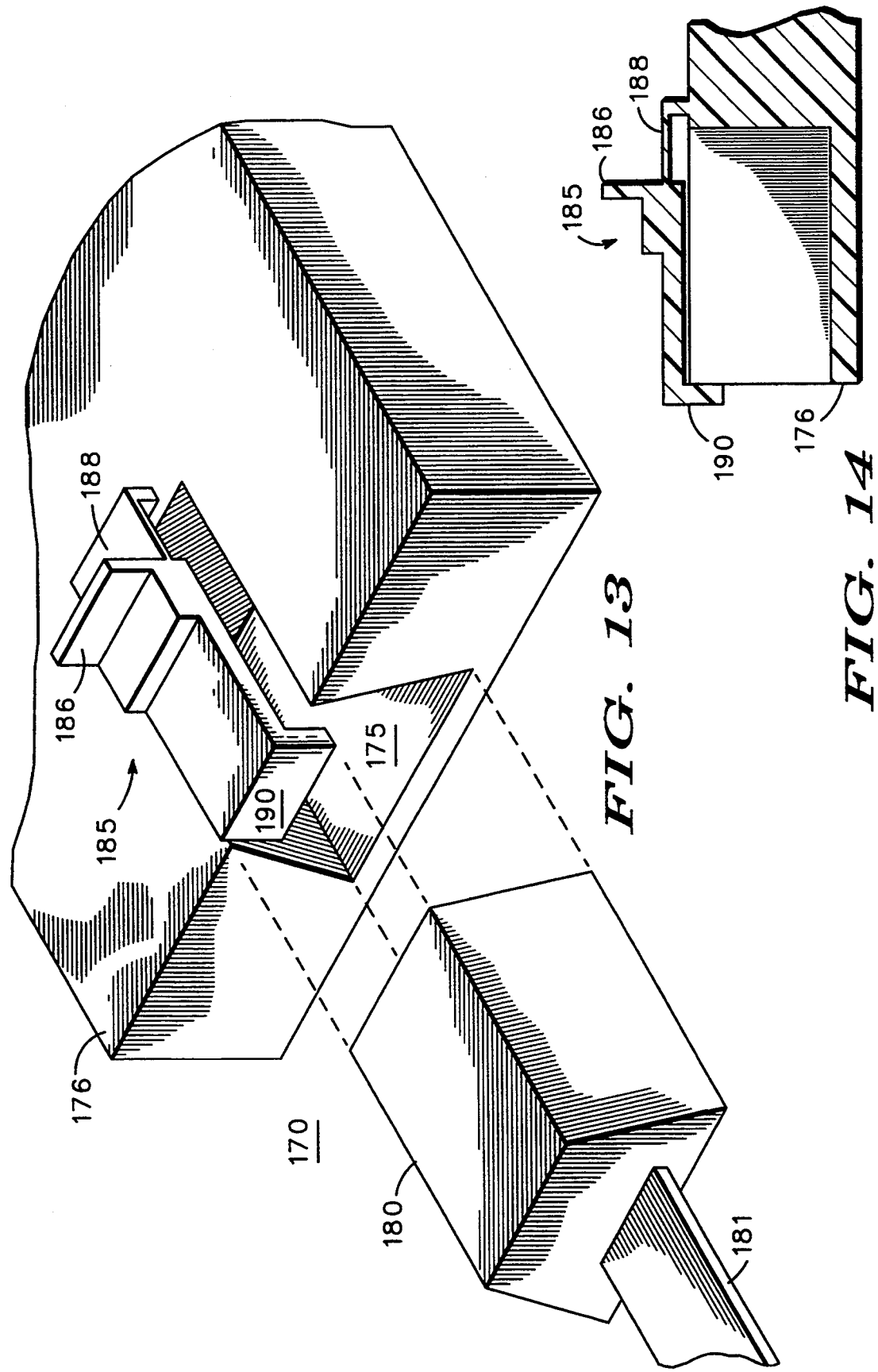

INTERFACE FOR COUPLING OPTICAL FIBERS TO ELECTRONIC CIRCUITRY

FIELD OF THE INVENTION

The present invention pertains to an electrical/optical interface and more specifically to connectors utilizing molded waveguides for coupling optical fibers to electronic components.

BACKGROUND OF THE INVENTION

At present, it would be highly desirable to utilize optical fibers and especially fiber ribbons, containing pluralities of fibers, to transmit optical signals between remote electrical components and over relatively long distances. Optical fibers are desirable for these applications because they have very high bandwidth capabilities and are relatively easy and inexpensive to manufacture.

However, connecting optical semiconductor components, such as light detectors and light generators (e.g., LEDs and lasers) to the ends of the optical fibers is a difficult and expensive task. Typically, two critical steps in optical alignment are maximizing coupling efficiency and affixing of an optical semiconductor component in an exact position after alignment is achieved. Optical alignment which maximizes coupling efficiency is completed by a process called active alignment. The active alignment process is a technique that positions optical semiconductor components with an optical fiber as a signal is being passed through. Active alignment is a labor intensive task and is not cost effective to mass production of optical couplers and is consequently is not an applicable manufacturing process. Once the optical semiconductor component is aligned to the optical fiber, the optical semiconductor component and the optical fiber must be locked in place with minimal movement. Several current affixing methods or processes include epoxies, laser welding, and low melting-point solder. However, heat developed during these affixing process causes both the optical semiconductor and optical fiber components to expand and contract during cooling, thus causing a misalignment and reduces coupling efficiency.

Therefore, it is desirable to develop apparatus to optimize the formation of electrical to optical links and especially between optical semiconductor components and optical fibers which increases performance and reduces manufacturing costs.

SUMMARY OF INVENTION

It is a purpose of the present invention to provide a new and improved interface for coupling optical fibers to electronic circuitry.

It is another purpose of the present invention to provide a new and improved interface for coupling optical fibers to electronic circuitry which is capable of quick and easy connections and disconnections between the optical fibers and electronic circuits.

It is another purpose of the present invention to provide a new and improved interface for coupling optical fibers to electronic circuitry which is relatively simple and inexpensive to manufacture.

The above described problems and others are solved and the above described purposes and others are realized in an interface for coupling optical fibers to electronic circuitry including a base having formed therein a keyway with guide rails having axial alignment means associated therewith, a plurality of optical waveguides molded in the base with each waveguide having an optical input/output positioned in a first surface of the keyway, a keyway mating portion formed to slideably engage the keyway guide rails and axial alignment means to align at least one surface of the mating portion in two orthogonal directions with the first surface of the keyway, and a plurality of optical fibers each having one end mounted in the keyway mating portion with the one end of each of the plurality of fibers being positioned to be aligned with one of the input/outputs positioned in the first surface when the mating portion is slideably engaged in the keyway.

BRIEF DESCRIPTION OF THE DRAWINGS

Referring to the drawings:

FIG. 13 is a view in perspective of another optical waveguide and optical connector; and FIG. 14 is a view in side elevation of the optical connector illustrated in FIG. 13.

DESCRIPTION OF THE PREFERRED EMBODIMENT

Figure 1:
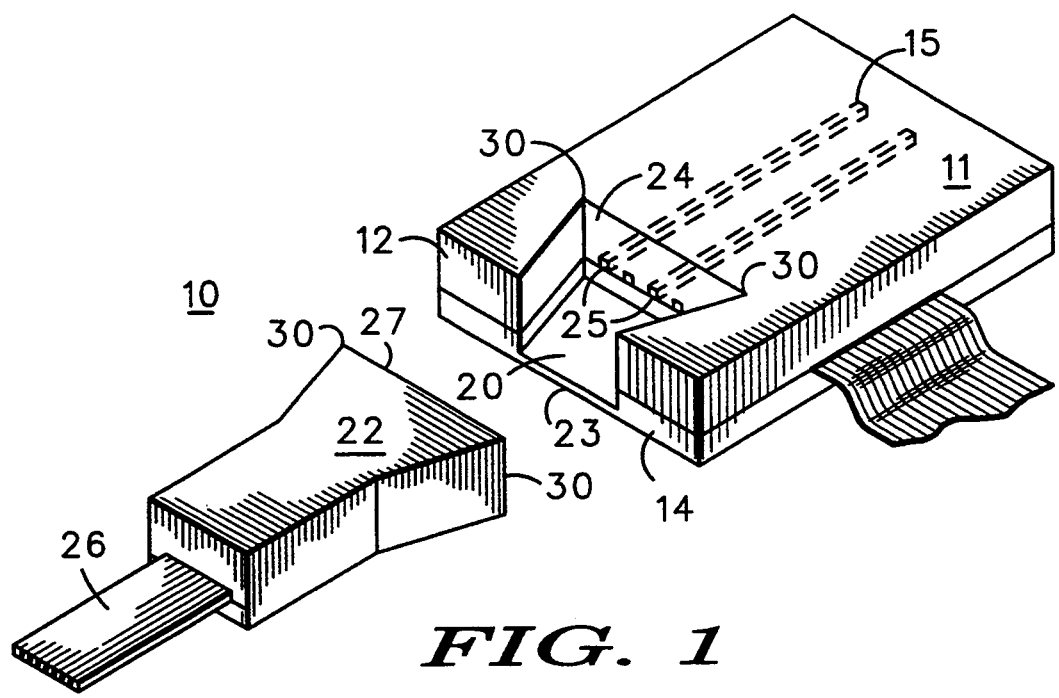
FIG. 1 is a view in perspective, portions thereof broken away, of an optical interface embodying the present invention.

FIG. 1 is a perspective view of an optical interface 10 embodying the present invention. Interface 10 includes a base, generally designated 11, including a plurality of molded optical waveguide. The molded optical waveguides are made by molding a first cladding layer 12, second cladding layer 14, and cores 15. Second cladding layer 14 is molded with axially extending channels in the inner surface thereof, which channels are designed to receive unprocessed core material therein. Typically, the inner surfaces of molded first cladding layer 12 and molded second cladding layer 14 are joined by an optically transparent material which forms cores 15 of the molded optical waveguides and acts as an adhesive and an optically transparent polymer, or epoxoide. The optically transparent material generally may be any of several materials, such as epoxies, plastics, polyimides, or the like. Generally, refractive indexes of these optically transparent materials range from 1.54 to 1.58. It should be understood that to form an optical waveguide the refractive index of cores 15 should be at least 0.01 greater than the refractive index of cladding layers 12 and 14.

In this specific embodiment of molded optical waveguide, epoxy is used to join the inner surface of first cladding layer 12 to the inner surface of second cladding layer 14. Application of the epoxy is done in a manner so as to completely fill the channels of first cladding layer 12, thereby forming cores 15. Further, by having cores 15 completely surrounded by cladding layers 12 and 14, cores 15 have superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in the molded optical waveguide, to match refractive indexes of cladding layers 12 and 14.

Typically, the epoxy may be cured by a variety of methods, such as air drying, exposure to UV light, heat treating, or the like. Selection of specific curing methods is application specific as well as being dependent upon selection of the adhesive and the cladding materials that are used for making first and second cladding layers 12 and 14.

By way of example only, first cladding layer 12 and second cladding layer 14 are made by injecting a transparent polymer molding compound, available under the Tradename HYSOL MG18 from Dexter Corporation, into molds (not shown) provided for the purpose. Temperature of the molds range between 150° C. to 175° C. with a preferred temperature range from 160 degrees Celsius to 165 degrees Celsius. Molding pressure of the molds range between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C.

Upon completion of the curing time, first cladding layer 12 and second cladding layer 14 are removed from the molds. Typically, a post-curing step is necessary in order to achieve maximum physical and electrical properties of the HYSOL material. This step generally proceeds at 150 degrees Celsius for approximately 2 to 4 hours. Completion of the post-cure step results in first cladding layer 12 and second cladding layer 14 having a refractive index of approximately 1.52.

Once the molding and curing processes, as well as the removal of the first and second cladding layers 12 and 14 from their respective molds have been completed, the first and second cladding layers 12 and 14 are ready to be assembled. Assembly is achieved by applying, to the inner surface of one of the cladding layers, an optically clear adhesive with a refractive index at least 0.01 higher than the material forming the first and second cladding layers 12 and 14. In this specific embodiment, this is accomplished by applying an optically clear epoxy available under a Tradename EPO-TEK 301-2, or 353-ND, from EPOXY TECHNOLOGY INC. Typically, after the adhesive is applied to the inner surface of first cladding layer 12, the inner surface of second cladding layer 14 is compressed against the inner surface of first cladding layer 12, thereby squeezing and filling the channels, by pressure or capillary action,g and adhering both first cladding layer 12 and second cladding layer 14 together.

Curing times for the adhesive epoxy is dependent upon temperature, e.g., at room temperature curing time is 2 days and at 80 degrees Celsius curing time is 1.5 hours. Additional information as to the molding and construction of the molded optical waveguide is available in copending U.S. patent application entitled "Molded waveguide and method for Making Same", Ser. No. 07/889,335, filed May 28, 1992 and assigned to the same assignee (now U.S. Pat. No 5,265,184).

Optical interface 10 also includes a keyway 20 formed in one edge of base 11 and a keyway mating portion 22 adapted to be slideably engaged in keyway 20. In this specific embodiment, keyway 20 is formed generally perpendicular to a plane parallel with cladding layers 12 and 14, or perpendicular to the major surfaces of base 11. Also, keyway 20 has a generally dovetailed cross-section. Further, keyway 20 extends laterally through cladding layer 12 and partially through cladding layer 14, the remaining portion 23 of cladding layer 14 forming a stop for keyway mating portion 22. It will of course be understood that keyway 20 can be formed in a variety of ways, including but not limited to molding with cladding layers 12 and 14, milling, etc. In this specific embodiment keyway 20 is molded for accuracy and convenience.

A surface 24 of keyway 20 has a plurality of optical input/outputs 25 formed therein. Each input/output 25 is actually a polished end of one core 15. Keyway mating portion 22 has a plurality of optical fibers, which in this embodiment are in the form of a fiber ribbon 26, molded therein. In this specific embodiment, the plurality of optical fibers in fiber ribbon 26 are positioned in keyway mating portion 22 so as to extend completely through keyway mating portion 22 and so that one end of each optical fiber lies in a surface 27 of keyway mating portion 22. Surface 27 of keyway mating portion 22 is parallel and in abutting engagement with surface 24 of keyway 20 when keyway mating portion 22 is mated within keyway 20. Further, fiber ribbon 26 is positioned so that the one end of each optical fiber is in optical communication with one input/output 25 when keyway mating portion 22 is mated within keyway 20.

In general, cores 15 are formed with approximately the same outer dimensions as the cores of the optical fibers in fiber ribbon 26. However, in embodiments where portions of molded waveguide are utilized in keyway mating portion 22 in conjunction with fiber ribbon 26, waveguides 15 and the mating waveguides are tapered slightly adjacent optical input/output 25 to allow for easy alignment. This tapering effect is easily incorporated because of the molding techniques utilized in the construction of the waveguides in base 11 and in the construction of keyway mating portion 22. As an example, a light input is tapered outwardly so as to be slightly larger than a mating optical fiber or light output so that light from the output dumps into a slightly larger waveguide, called a light bucket. The light outputs are tapered to be slightly smaller by adiabatic tapering. The result of the tapering is that alignment and manufacturing tolerances are substantially relaxed and, therefore, costs etc. are reduced.

While keyway 20, and keyway mating portion 22 are formed with a dovetail cross-section in this specific embodiment, it should be understood that any convenient configuration of surfaces 24 and 27 which holds them in abutting engagement and aligns the optical communication path between input/outputs 25 and fiber ribbon 26 can be utilized. In particular, keyway 20 and/or keyway mating portion 22 include a pair of guide rails which guide the movement of portion 22 into keyway 20. In the dovetail cross-section of the FIG. 1 embodiment, angularly shaped longitudinal edges 30 form guide rails which align portion 22 in a first direction. Guide rails can also have cross-sections which are rectangular, semi-circular, angular, or any combination thereof Axial alignment apparatus, portion 23 of cladding layer 14 in the embodiment of FIG. 1, is utilized to stop movement of portion 22 into keyway 20 when the correct mating position is achieved. In this specific embodiment the axial alignment apparatus is a stop, or shoulder, formed at the lower end of portion 22. It will of course be understood that the axial alignment apparatus can be any convenient stop, detent, spring loaded locks, or combination thereof. Further, in most applications it is preferred to incorporate axial alignment apparatus that holds portion 22 fixedly in the mating position once that position is achieved. Thus, once portion 22 is matingly engaged in keyway 20, surface 27 is aligned with surface 24 in two orthogonal directions and optical communication between input/outputs 25 and fiber ribbon 26 is complete.

In many applications it is desirable and/or necessary to provide either keyway 20 or keyway mating portion 22 with some form of quick release for releasing keyway mating portion 22 from engagement with keyway 20 when a force of a predetermined magnitude and in a direction tending to separate keyway mating portion 22 from keyway 20 is applied to fiber ribbon 26. The quick release mechanism can simply be deformable edges (the wedge shaped portion of the dovetail cross-section) on either or both keyway 20 and keyway mating portion 22. The deformable edges are formed of a deformable polymer with elastic properties that return to the normal shape after the forced disconnect. In other embodiments a simple spring loaded detent will provide the desired quick release action.

Figure 2:
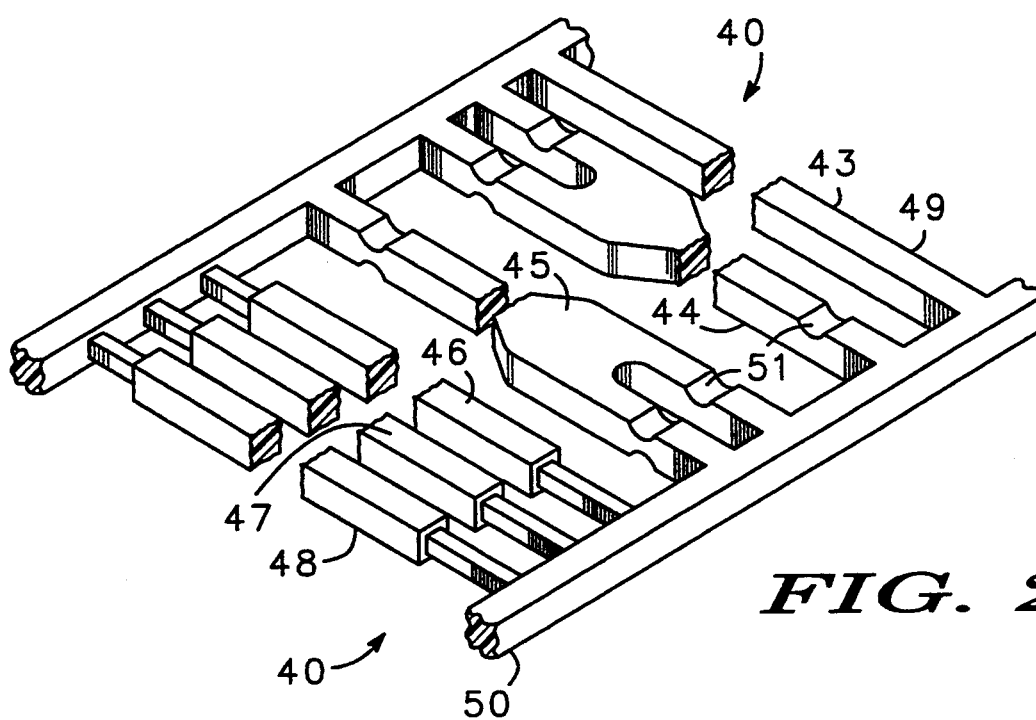
FIG. 2 is a view in perspective of a core for a second molded optical waveguide.
Figure 3:
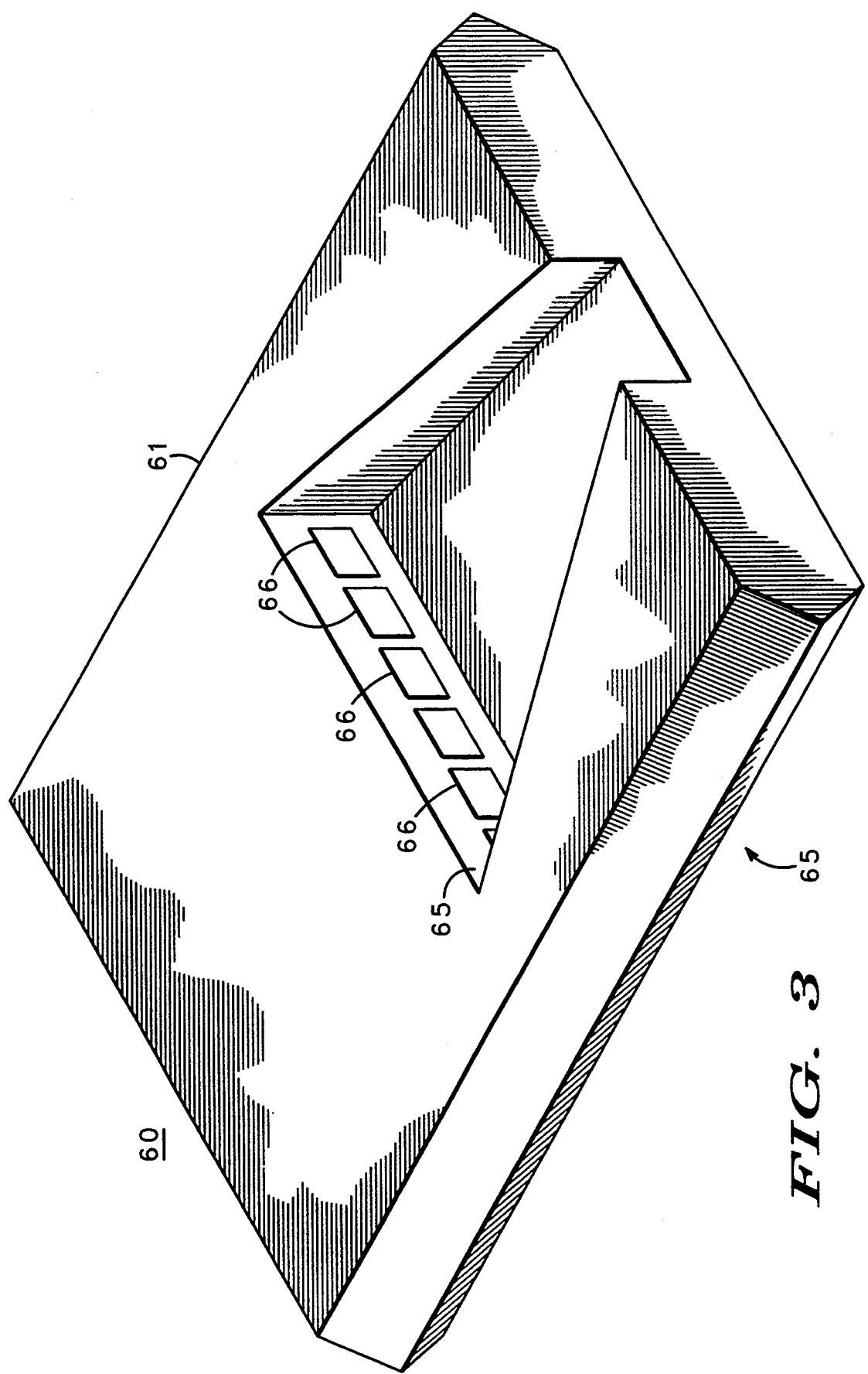
FIG. 3 is a view in perspective of the core illustrated in FIG. 2 molded in a cladding region.

A second type of base with molded waveguides is illustrated in FIGS. 2 and 3. FIG. 2 is an enlarged perspective view of core regions 40, illustrating end configurations, that have been molded in a first molding step. Core regions 40 have been removed from a mold, thus illustrating each separate optical core 43–48 and supporting structure. An end portion 49 of optical core 43 illustrates a direct connection of end portion 49 to support structure 50. In this specific example, optical core 43 and support structure 49 are both made in a rectangular format, thus end portion 49 connects to support structure 50 in a rectangular fashion. End portions of each of the other optical cores 44–48 illustrate a variety of configurations for making the end portions. More specifically, some of the end portions are made with grooves 51 that are indented into the end portions. Grooves 51 are made in such a manner that a sufficient amount of material is removed so as to enhance cleaving or breaking off of the end portions from optical cores 44 and 45, respectively. Additionally, the remaining end portions are made in an alternative configuration, wherein they are molded with thin end portions so as to enhance removal of the end portions from optical cores 46, 47, and 48. However, while only two specific examples of cleave enhancing geometries are described hereinabove, it is not the intent of these examples to be totally inclusive and it should be noted that other methods are capable of being used to enhance the cleaving or breaking off of the end portions from optical cores 43–48.

Core regions 40, and with specific reference to optical portions 44 and 45, illustrate the potential for molding a variety of optical core configurations in this technique. Optical cores 44 and 45 are fabricated with a Y-division or split, thus enabling light (not shown) to be split or divided into portions. While optical cores 44 and 45 each show only one split, it should be evident that multiple splits are capable of being formed, thus forming a tree structure and enabling light to be split and/or mixed many times.

FIG. 3 is a simplified enlarged perspective view of molded waveguide 60 with a unitary cladding region 61. In FIG. 3, a keyway is illustrated in broken lines for convenience in illustrating and describing the specific molding technique. Generally, upon completion of curing processes, and the like, waveguide 60 and the associated support structure 50, including end portions of the optical cores, are removed from a mold. Typically, removal of support structure 50 and associated end portions from waveguide 60 is achieved by any suitable means, such as cleaving, breaking, sawing, or the like. Removal of support structure 50 and the associated end portions may be enhanced by the end configurations as described hereinabove. In this embodiment, removal of support structure 50 and the associated end portions is accomplished by a sawing or cleaving device that is used to cut across surface 65, thus leaving ends 66 of optical cores 43–48 with a clear, smooth surface. It should also be evident that the cleaving device typically is an automated device such as robotic arm, or the like.

In some specific applications it may be necessary to polish ends 66 of optical cores 43–48 to an optically smooth surface. Polishing of optical core ends 66 typically is achieved by either a wet polishing wheel or a dry polishing wheel. Polishing processes are capable of being physical processes, chemical processes, or a combination of both physical and chemical processes. For example, optical core ends 66 are mechanically pressed onto a wheel containing a slurry mixture (not shown) on a pad (not shown) that has a rotational movement, side to side motion, or vibrational motion, or any combination thereof, thus mechanically and chemically polishing optical core ends 66.

Additional details on this type of molding of optical waveguides are disclosed in a copending application entitled "MOLDED WAVEGUIDE WITH A UNITARY CLADDING REGION AND METHOD OF MAKING" filed Feb. 19, 1993, bearing Ser. No. 08/019,731 and assigned to the same assignee as the present application.

Figure 4:
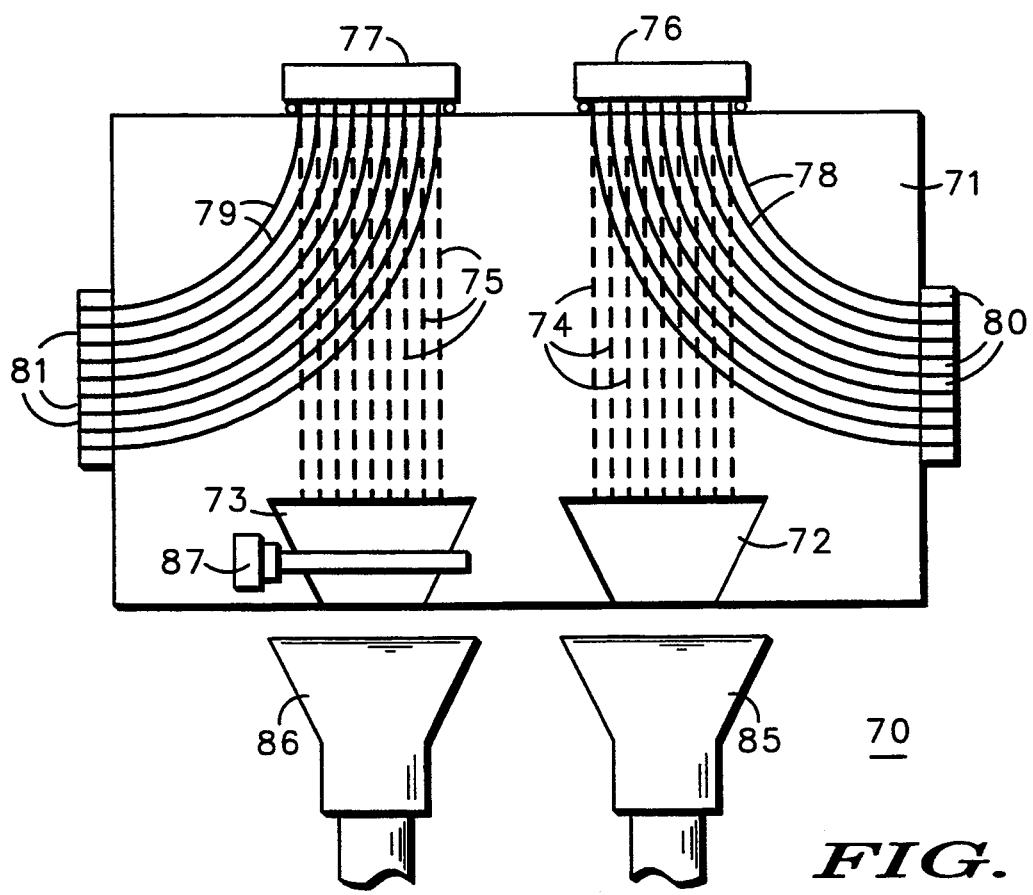
FIG. 4 is a view in top plan of an interface for coupling optical fibers to electronic circuitry in accordance with the present invention.

Referring to FIG. 4, a view in top plan of an optical/electrical interface 70 for coupling optical fibers to electronic circuitry in accordance with the present invention is illustrated. Interface 70 includes a base 71 having a pair of keyways 72 and 73 formed therein. Each keyway 72 and 73 has a plurality of optical waveguides 74 and 75, respectively, (with the approximate positions illustrated in broken lines) associated therewith, as described in conjunction with FIGS. 1 or 3. Optical waveguides 74 and 75 extend across base 71 from the rear surface of the keyways 72 and 73, respectively, in a front edge of base 71 to a rear edge of base 71. Arrays 76 and 77 are mounted at the rear edge of base 71 and include light generators and/or light detectors for introducing light into aligned optical waveguides or for receiving light from aligned optical waveguides. Electrical connections are made to arrays 76 and 77 by means of leads 78 and 79, respectively, (with the approximate positions illustrated in broken lines). Leads 78 and 79 are molded into base 71 and extend through base 71 to transverse edges thereof where they connect to external connection pads 80 and 81, respectively.

A pair of keyway mating portions 85 and 86 are designed to slideably engage keyways 72 and 73, respectively. In each instance, one of the keyway and the keyway mating portions has a portion with a generally dovetail cross-section and the other of the keyway and the keyway mating portions has an opening with a mating generally dovetailed cross-section. In this specific embodiment, keyways 72 and 73 have a dovetailed opening and keyway mating portions 85 and 86 are each formed with a generally dovetailed cross-section. Each keyway and keyway mating portion has associated therewith axial alignment apparatus, such as a lip or other stop extending outwardly to limit movement of keyway mating portions 85 and 86 through keyways 72 and 73. As illustrated in FIG. 4, for example, a plastic spring clip 87 is mounted on the upper surface of base 71 so as to extend across keyway 73 in the engaged position. A similar clip could be provided in association with keyway 72. Spring clip 87 is designed to move aside to allow sliding engagement of keyway mating portion 86 into keyway 73, a lip, or stop, adjacent the lower surface of keyway 73 limits movement of keyway mating portion 86. Once keyway mating portion 86 is properly engaged in keyway 73, spring clip 87 is returned to the position illustrated and keyway mating portion 86 is firmly locked in the engaged position.

Figure 5:
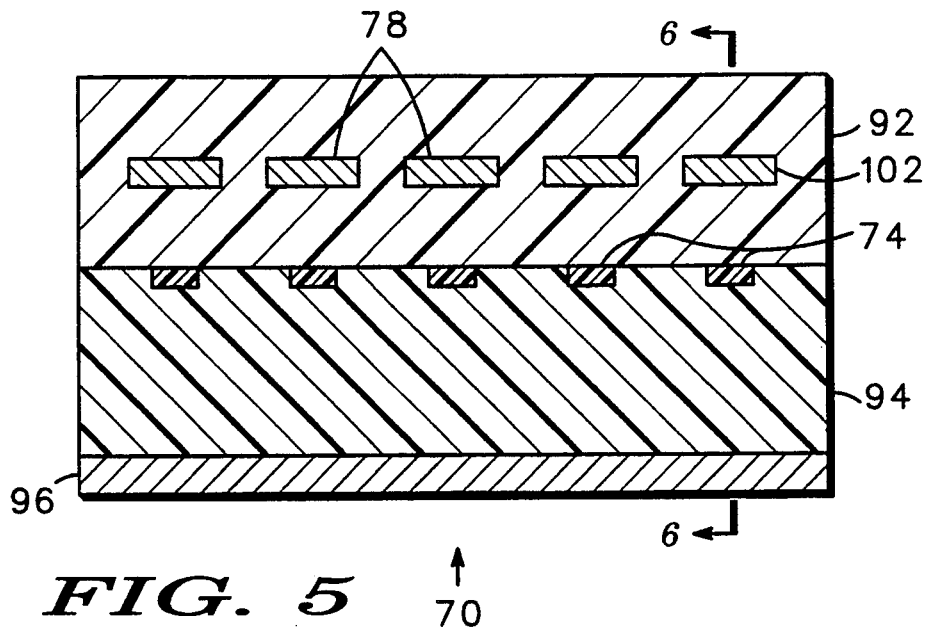
FIGS. 5, 6 and 7 are sectional and exploded views of portions of the interface illustrated in FIG. 4.
Figure 6:
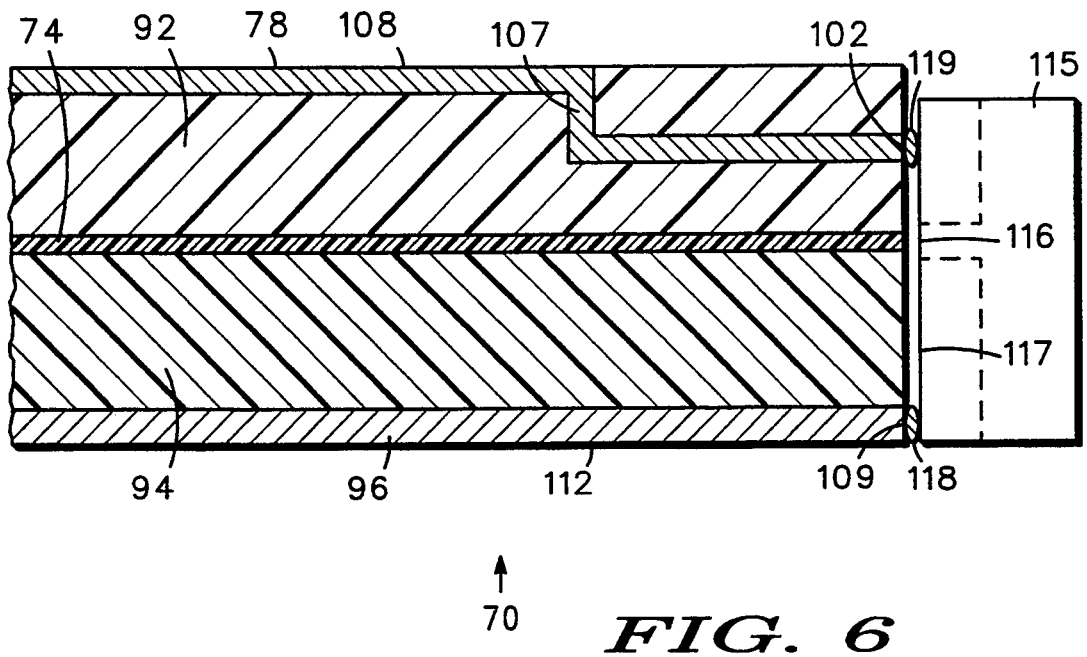
Figure 7:
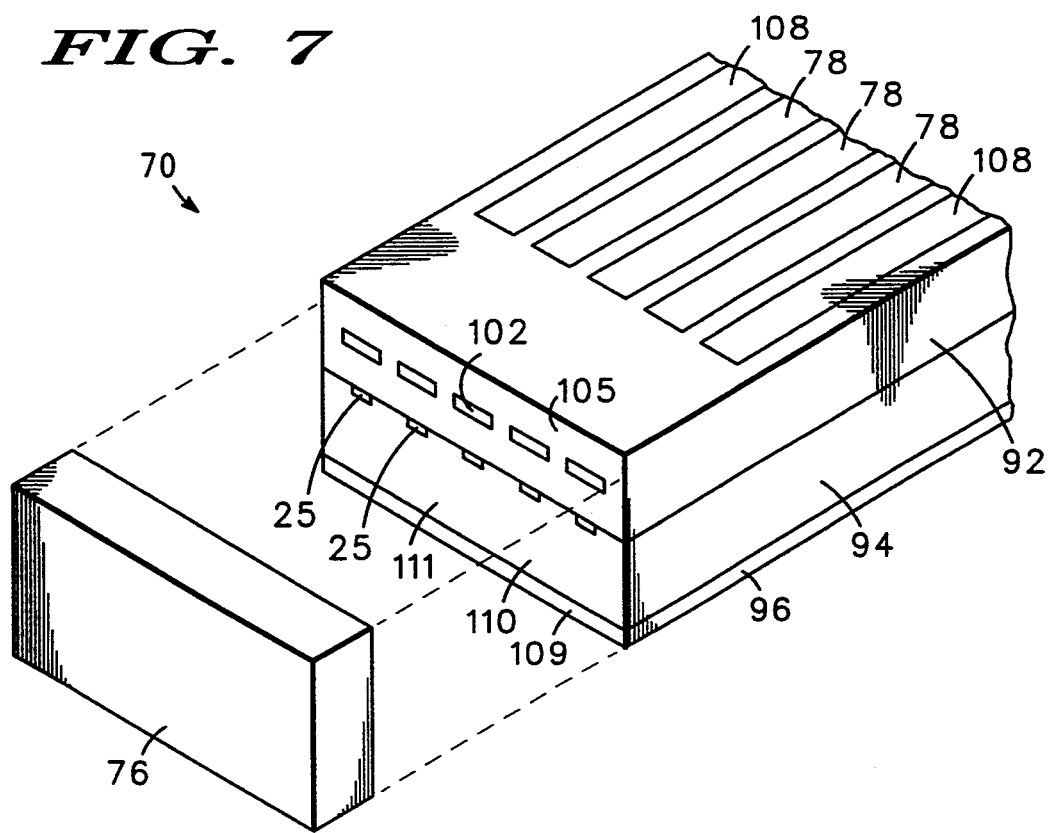

Referring specifically to FIG. 5, a partial sectional view of base 71 of FIG. 4 is illustrated. FIG. 6 is a partial sectional view as seen from the line 6—6 in FIG. 5 and FIG. 7 is a perspective view of the same portion of base 71 with array 76 illustrated in an exploded view. FIGS. 5, 6 and 7 are provided to illustrate the molded electrical connections in more detail. The plurality of optical waveguides include a first cladding layer 92 and a second cladding layer 94 with optical cores 74 positioned therebetween, generally as described above. In addition, second cladding layer 94 has a ground plane, or ground conductor, 96 affixed to the lower surface thereof. Also, plurality of electrical conductors 78, in this embodiment one for each core 74, are molded into first cladding layer 92. Electrical conductors 78 are, for example, provided in the form of a flexible leadframe, which leadframes are well known in the semiconductor art. Ground conductor 96 and conductors 78 are formed of any convenient electrically conducting material, such as copper, aluminum, gold, silver, or combinations thereof, etc.

As can be seen especially in FIGS. 6 and 7, electrical conductors 78 are molded into first cladding layer 92 and each have a first end forming an electrically accessible contact 102 in end 105 of base 71. Electrical conductors 78 extend into the bulk of first cladding layer 92 and are bent at 107 with two generally ninety degree bends so that a portion 108 of each electrical conductor 78 lies in the upper surface of first cladding layer 92 and is available for external electrical connections thereto. The position of portion 108 in the upper surface of first cladding layer 92 depends upon the specific application and the position and type of external electrical connections to be made.

Ground conductor 96 is a layer of electrically conducting material such as copper, aluminum, gold, silver, etc. Ground conductor 96 may be molded into, or along with, cladding layer 94, or it may be deposited on cladding layer 94 after the formation thereof. Further, while ground conductor 96 is referred to as a ground plane in this specific embodiment it will be understood by those skilled in the art that in some special applications ground conductor 96 may be molded into second cladding layer 94 and may include a plurality of individual conductors similar to electrical conductors 78. In either case, ground conductor 96 generally includes an externally accessible electrical contact 109 positioned in an end 110 of second cladding layer 94, which end 110 lies in a plane with end 105 of first cladding layer 92, both of which define a first end 111 of base 71. Also, ground conductor 96 generally includes an externally accessible electrical portion 112 lying in an external surface of second cladding layer 94.

Referring to FIGS. 6 and 7, optical array 76 is illustrated affixed to first end 111 of base 71, which optical array 76 includes at least one optical device. In this specific embodiment optical array 76 contains five optical devices 115. Optical devices 115 can be any of the devices known in the art which detect or generate light, or any combination thereof, such as light detecting diodes, light emitting diodes, vertical cavity surface emitting lasers, any of the other known lasers, field emission devices, etc. Each optical device 115 includes an optical input/output 116 positioned in a surface 117 of optical array 76. Each of the optical input/outputs 116 is aligned with a different one of the cores 74 so that light travelling down aligned core 74 enters input/output 116 of optical device 115 or light generated by optical device 115 leaves input/output 116, enters aligned core 74 and is conducted thereby to the opposite end.

Each optical device 115 has a pair of spaced apart electrical terminals positioned in surface 117 of optical array 76 so that one of the terminals connects to contact 102 adjacent, or associated with, aligned core 74 and the other terminal connects to contact 109 of ground conductor 96. The electrical terminals of each optical device 115 are connected to the contacts 102 and 109 adjacent to, or associated with, the aligned core 74 at 118 and 119 (see FIG. 6) by means of a weld, reflowable connection, or bump, using material such as conductive epoxy, solder, solder paste, gold, indium, etc. Generally, since electrical conductors 78 are molded into cladding layer 92 and ground conductor 96 is molded into, or deposited on the surface of, cladding layer 94 the positioning of contacts 102 and 109 is sufficiently accurate to allow satisfactory alignment of optical input/outputs 116 with cores 74 by simply affixing the pair of terminals of each optical device 115 to contacts 102 and 109. The affixing can be performed manually or with any of the robotics presently available for assembly purposes.

Figure 8:
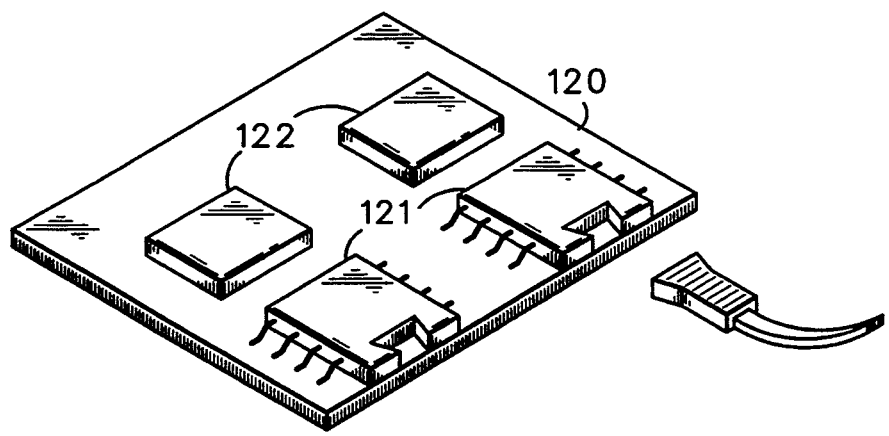
FIG. 8 is a perspective view of interfaces similar to that shown in FIG. 4, utilized in conjunction with electronic circuitry.

Once optical array 76 is physically and electrically affixed to base 71 the entire assembly can be, for example, surface mounted on a printed circuit board or could be included in a hybrid package with semiconductor chips and the like. Referring specifically to FIG. 8, a printed circuit board 120 is illustrated having a pair of optical/electrical interfaces 121 mounted thereon and a plurality of semiconductor chips and/or hybrid packages 122. Electrical connections to chips and packages 122 are made in any of the usual ways, such as J-leads, surface mount, through holes, etc. Electrical connections from interfaces 121 are made utilizing similar methods and may include connections such as wire bonding between externally accessible portions 108 and contacts, or bonding pads 80, on printed circuit board 120, etc. In general a single contact to ground conductor 96 provides a connection to the opposite side of all of optical devices 115.

Additional details on this type of molding of optical waveguides are disclosed in a copending application entitled "OPTICAL WAVEGUIDE WITH CONTACTS UTILIZING LEADFRAMES". filed Jul. 27, 1992, bearing Ser. No. 07/920,073 and assigned to the same assignee (now U.S. Pat. No. 5,271,083).

Figure 9:
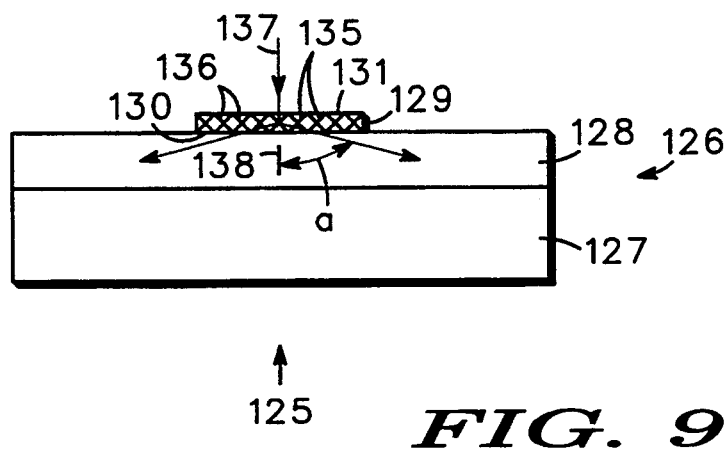
FIG. 9 illustrates, for purposes of explanation, a simplified bidirectional I/O node for an optical waveguide.

Referring specifically to FIG. 9, a simplified I/O node 125 is illustrated, for purposes of explanation. I/O node 125 includes an optical waveguide 126, which may be formed in accordance with either of the methods described in conjunction with FIGS. 1 and 3 or other methods. For purposes of this explanation waveguide 126 is formed by molding a first cladding layer 122 with a channel therein and, subsequently, filling the channel with an optically transparent material 128 to form the core. At least a portion of the upper surface of optical waveguide 126 is exposed and a layer 129 of transmissive holographic material is affixed thereover. Holographic layer 129 has first and second substantially parallel, spaced apart optical input/output surfaces 130 and 131, respectively, with first optical input/output surface 130 being affixed in overlying relationship to the exposed surface of optical waveguide 126. Holographic layer 129 has a first and a second plurality of gratings 135 and 136, respectively, formed therein so as to substantially extend between first and second optical input/output surfaces 130 and 131. Gratings 135 and 136 are positioned to form an angle with first and second optical input/output surfaces 130 and 131 of holographic layer 129 such that light rays 137 incident on second optical input/output surface 131 and substantially normal thereto are diffracted into optical waveguide 126 at an angle "a" formed with a transverse axis 138 of optical waveguide 126, greater than the critical angle of optical waveguide 126. In the example of FIG. 9, gratings 135 and 136 extend in opposite directions so that light rays 137 are launched into optical waveguide 126 in both directions.

Figure 10:
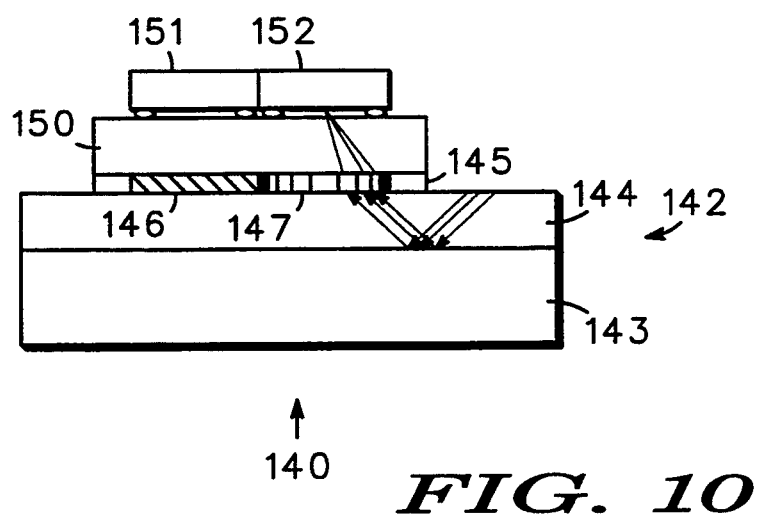
FIG. 10 illustrates diagramatically an I/O node in an optical channel waveguide including apparatus for utilizing the node.

FIG. 10 illustrates diagramatically an I/O node 140 in an optical channel waveguide including apparatus for utilizing node 140, constructed in accordance with the present methods. Node 140 includes an optical channel waveguide 142, which may be formed by either of the methods described above, or others, and which, in this embodiment, includes a molded first cladding layer 143 filled with an optically transparent material 144 forming the core. A layer 145 of transmissive holographic material is affixed in overlying relationship to the upper surface of waveguide 142. The transmissive holographic material of layer 145 can include photopolymer recording film of a type which may be purchased from, for example, DuPont De Nemours, Inc. under the trademark OmniDex, film 600 or film 610, a layer of dichromated gelatin (commonly known as DCG) or, in a somewhat different embodiment, a blazed dielectric grating can be used. Layer 145 has a first area 146 with two pluralities of gratings formed therein overlying an exposed area of waveguide 142. The gratings in area 146 are formed, as explained in conjunction with node 125 of FIG. 9, so that light rays directed onto the upper surface thereof are launched into waveguide 142 in both directions.

A second area 147 has gratings formed therein to allow some light rays travelling along waveguide 142 (within optically transparent material 144) to be diffracted out of waveguide 142. The amount of light diffracted out of waveguide 142 is essentially only a small sample of the total light in waveguide 142. A layer 150 of optically transparent material is affixed in overlying relationship on holographic layer 145. Layer 150 operates as a substrate for electronic components and electrical connections thereto. In some applications it may be possible to mount electronic components directly onto holographic layer 145 but any heat or other strain developed during the mounting process could damage holographic layer 145 and reduce the operating efficiency.

In this specific embodiment, a light generator 151 is mounted on an upper surface of layer 150 so as to direct generated light through layer 150 and in a substantially normal orientation onto area 146. Substantially all of the light generated by light generator 151 is launched into the core of waveguide 142. Light generator 151 is any of the well known electronic devices, such as vertical cavity surface emitting lasers, light emitting diodes, etc. A light detector 152 is mounted on the upper surface of layer 150 so as to receive light from area 147. Area 147 is formed generally in the shape of a Fresnel lens superimposed on gratings of the type in area 146 so that light emanating from the core of waveguide 142 is substantially focused onto a light input of light detector 152. Thus, light generated by light generator 151 is launched into waveguide 142 and travels both ways therein (or, if desired, a one way embodiment may be utilized) and a sample of light travelling within the core of waveguide 142 emanates out through area 147 where it is focused onto light detector 152. Thus, I/O node 140 is a relatively efficient light input node and, because of the small sample of light removed, it operates similar to a high impedance output node in an electrical bus.

In a specific embodiment, light generator 151 and light detector 152 are mounted on layer 150, by bump soldering, gold bumping, conductive epoxy, or any other convenient means, and external electrical connections are provided. Layer 150 is then affixed to layer 145 by some convenient means, such as a polymer adhesive. Layer 150 can be properly oriented over layer 145 by any of the well known techniques utilized in the semiconductor industry. While light generator 151 in conjunction with area 146 and light detector 152 in conjunction with area 147 are illustrated adjacent each other, it will be understood by those skilled in the art that only one or the other of the electronic components and associated areas might be utilized in specific applications, pluralities of either or both of the electronic components and associated areas might be utilized, and/or the electronic components and associated areas might be separated by a predetermined amount of space.

Figure 12:
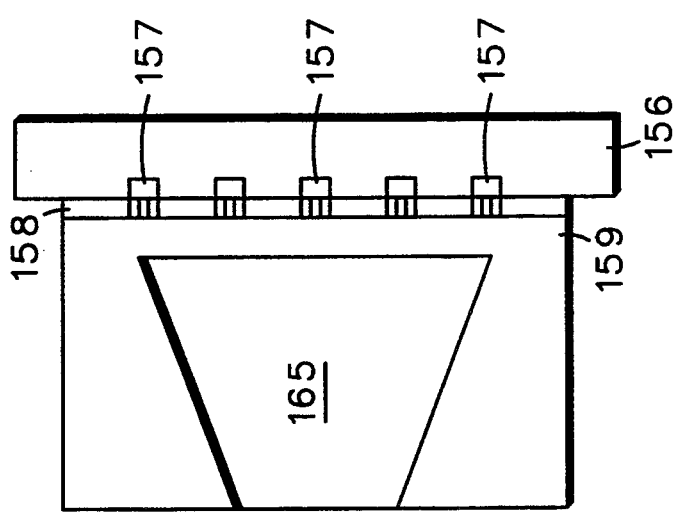
FIG. 12 is a view in side elevation of a structure similar to that illustrated in FIG. 11, illustrating a different arrangement of the various components.
Figure 11:
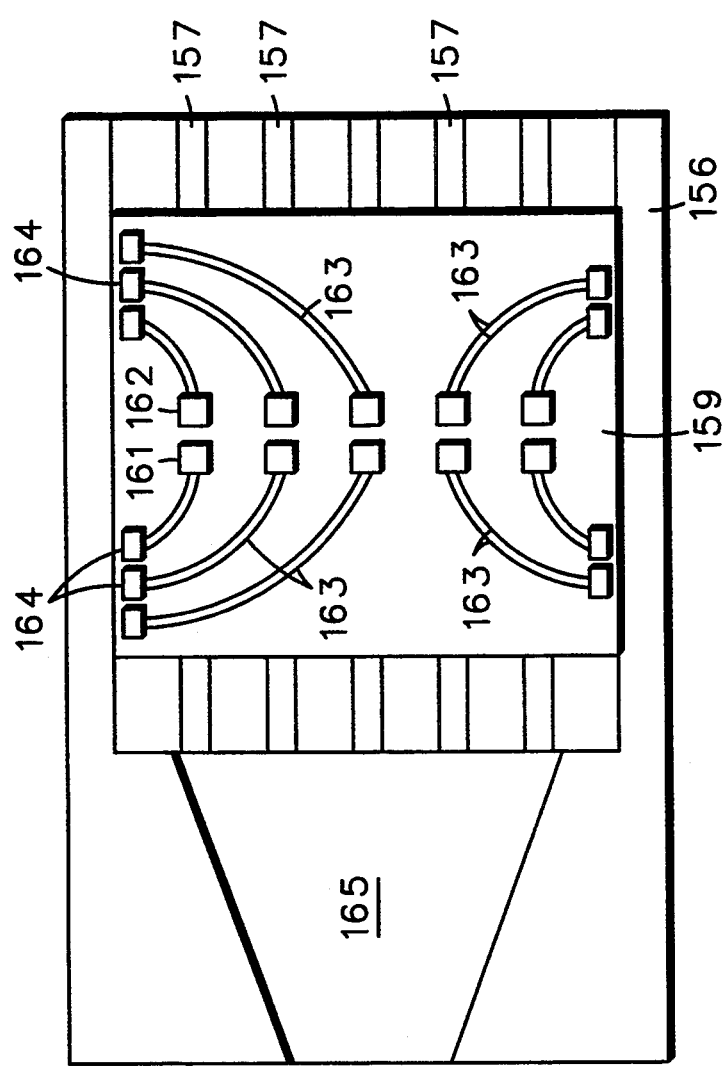
FIG. 11 is a view in top plan of a plurality of nodes and apparatus utilizing the nodes similar to that illustrated in FIG. 10.

Referring to FIG. 11, an embodiment of an optical bus 155 incorporating a plurality of I/O nodes and associated apparatus, formed in accordance with the present method, are illustrated in top plan and side elevation, respectively. Bus 155 is formed on a molded first cladding layer 156 including a plurality of channels filled with optically transparent material to form a plurality of optical channel waveguides 157. In this illustration only five optical channel waveguides 157 are utilized for simplicity, but it should be understood that any convenient number, such as eight (for eight bit digital signals) could be utilized. A layer 158 (see FIG. 12) of holographic material is affixed in overlying relationship to an exposed area in the upper surface of each waveguide 157. Holographic layer 158 includes gratings therein, similar to those described in conjunction with FIG. 10, associated with each waveguide 157.

A second substrate or layer 159 of optically transparent material has a plurality or array of pairs of light generators 161 and light detectors 162 mounted on the upper surface thereof. Electrical connections 163 to each of the light generators 161 and light detectors 162 are formed in optically transparent material by any convenient means, such as metal deposition, embedded flexible leads, etc. In this specific embodiment, connections 163 extend to an edge of transparent material 159 and each pair terminate in an external connecting pad 164. As explained previously, layer 159, after all of the mounting and electrical connections have been accomplished, is affixed to the upper surface of layer 158 so that light generators 161 and light detectors 162 are properly positioned over the appropriate gratings. Thus, the I/O nodes associated with optical bus 155 form an optical to electrical terminal and an electrical to optical terminal for the plurality of waveguides 157. Because the light can be launched and picked off from either one or both directions in waveguides 157, the terminals can be located anywhere along waveguides 157.

Molded first cladding layer 156 extends outwardly beyond waveguides 157 in one direction and a keyway 165 is formed therein. Keyway 165 is illustrated as a generally dovetail shaped opening, but it should be understood that other shapes etc. might be utilized, as explained above. A keyway mating portion, not shown is adapted to slideably engage keyway 165 to provide optical communication with a plurality of optical fibers, such as a fiber ribbon or the like. It should also be understood that a second keyway, similar to keyway 165 could be provided on the opposite end of cladding layer 156, in some applications, for coupling the same optical signals to another electronic board. Further, it should be understood that the various electronic components, i.e., light generators 161 and light detectors 162, could be mounted in arrays on the ends of cladding layer 156 and the keyway could be formed on the top, as a portion of transparent layer 159, as illustrated in simplified form in FIG. 12.

Additional details on manufacturing I/O nodes of this type disclosed in a copending application entitled "METHOD OF MANUFACTURING I/O NODE IN AN OPTICAL CHANNEL WAVEGUIDE AND APPARATUS FOR UTILIZING" filed Dec. 21, 1992 with Ser. No. 07/994,235.

Referring to FIGS. 13 and 14, another embodiment of an interface 170 is disclosed. In this specific embodiment a keyway 175 is formed in an edge of a base 176. A keyway mating portion 180 mates with keyway 175 similar to the mating described in conjunction with the structure of FIG. 1, except that sliding action is parallel to the major surface of base 176. Also, keyway 175 formed in base 176 is a blind keyway with the axial alignment apparatus formed integrally therewith. In most applications it will be desirable to position optical input/outputs in the blind end of keyway 175, but in some specific applications optical input/outputs may be placed in the angular sides of the keyway, in the lower surface of the key way, or in some applications combinations of the positions may be utilized. When optical input/outputs are placed in any of the sides, other than the blind end, use of structures such as those disclosed in FIGS. 9–12 may be expedient. Also, in this embodiment plurality of optical fibers 181 are molded in keyway mating portion 180 so as to extend the length thereof.

In this embodiment a press to lift locking mechanism 185 is utilized to hold keyway mating portion 180 fixedly engaged in keyway 175. Mechanism 185 includes a handle 186 affixed to base 176 by a plastic spring member 188. Spring member 188 holds handle 186 in the upwardly directed position illustrated in FIGS. 13 and 14. An L or hook shaped portion 190 of plastic extends from handle 185 and engages a rear edge of keyway mating portion 180 when keyway mating portion 180 is in the fully engaged position in keyway 175. Pushing on handle 186, so as to depress handle 186 toward the upper surface of base 176, lifts hook shaped portion 190 and releases keyway mating portion 180 so that keyway mating portion 180 can be disengaged from keyway 175. It should be noted that this specific embodiment of locking mechanism 185 can be formed in a single piece by some convenient plastic molding method, such as injection molding or the like. Additionally, quick release apparatus might be incorporated in this locking mechanism by simply adjusting the angle of one or both of the rear edge of keyway mating portion 180 and hook shaped portion 190.

Thus, new and improved interfaces for coupling optical fibers to electronic circuitry have been disclosed. The disclosed new and improved interfaces are capable of quick and easy connections and disconnections between the optical fibers and electrical circuits. Further, the new and improved interfaces are relatively simple and inexpensive to manufacture. Also, a variety of different configurations are disclosed and others are possible. In addition the variety of interfaces, electrical and optical, include relatively inexpensive locking mechanisms, most of which can be constructed for quick release in the event of excessive force on the optical fibers, such as dropping the equipment.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An interface for coupling optical fibers to electronic circuitry comprising:
   a base having formed therein a keyway with guide rails having axial alignment means associated therewith;
   a plurality of optical waveguides molded in the base with each waveguide having an optical input/output positioned in a first surface of the keyway;
   a keyway mating portion formed to slideably engage the keyway guide rails and axial alignment means to align at least one surface of the mating portion in two orthogonal directions with the first surface of the keyway; and
   a plurality of optical fibers each having one end mounted in the keyway mating portion with the one end of each of the plurality of fibers being positioned to be aligned with one of the input/outputs positioned in the first surface when the mating portion is slideably engaged in the keyway.

2. An interface for coupling optical fibers to electronic circuitry as claimed in claim 1 wherein the keyway mating portion includes molded plastic surrounding and physically holding portions of the plurality of optical fibers adjacent the one end of each of the plurality of optical fibers.

3. An interface for coupling optical fibers to electronic circuitry as claimed in claim 2 wherein the plurality of optical fibers includes a fiber ribbon having a keyway mating portion molded thereon adjacent an end.

4. An interface for coupling optical fibers to electronic circuitry as claimed in claim 1 wherein one of the keyway and the keyway mating portion includes quick release means for releasing the keyway mating portion from engagement with the keyway when a force of a predetermined magnitude and in a direction tending to separate the keyway mating portion from the keyway is applied to the plurality of optical fibers.

5. An interface for coupling optical fibers to electronic circuitry as claimed in claim 1 wherein the base has a major surface and the keyway guide rails extend longitudinally generally perpendicular to the major surface.

6. An interface for coupling optical fibers to electronic circuitry as claimed in claim 1 wherein the base has a major surface and the keyway guide rails extend longitudinally generally parallel to the major surface.

7. An interface for coupling optical fibers to electronic circuitry as claimed in claim 1 wherein the axial alignment means includes a stop positioned adjacent one end of the guide rails.

8. An interface for coupling optical fibers to electronic circuitry as claimed in claim 1 wherein the plurality of optical waveguides are formed by plastic molding.

9. An interface for coupling optical fibers to electronic circuitry as claimed in claim 8 wherein the optical waveguides include a first molded cladding layer having a plurality of channels, a second molded cladding layer, and an adhesive core material, wherein the adhesive core material fills the plurality of channels securing the first molded cladding layer and the second molded cladding layer together.

10. An interface for coupling optical fibers to electronic circuitry as claimed in claim 9 wherein the first molded cladding layer, the second molded cladding layer and the adhesive core material have a first, a second, and a third refractive index, respectively, and wherein the first and second refractive indexes are lower than the third refractive index.

11. An interface for coupling optical fibers to electronic circuitry as claimed in claim 10 wherein the refractive index of the first molded cladding layer and the second molded cladding layer ranges between 1.50 to 1.54 and the refractive index of the adhesive core material ranges between 1.54 to 1.58.

12. An interface for coupling optical fibers to electronic circuitry as claimed in claim 11 wherein the first and second refractive indexes are at least 0.01 lower than the third refractive index.

13. An interface for coupling optical fibers to electronic circuitry as claimed in claim 9 wherein the first cladding layer and the second cladding layer is selected from a group Consisting of optically transparent materials, epoxies, plastics, and polyimides.

14. An interface for coupling optical fibers to electronic circuitry as claimed in claim 8 wherein the optical waveguides include a plurality of molded core regions, the plurality of core regions each having a first end and a second end, and a molded unitary portion that surrounds the plurality of core regions so that the plurality of core regions are clad by the unitary portion that surrounds the plurality of core regions and wherein the first and second ends of the plurality of core regions are exposed through the molded unitary portion.

15. An interface for coupling optical fibers to electronic circuitry as claimed in claim 1 wherein one of the keyway and the keyway mating portion has a portion with a generally dovetail cross-section and the other of the keyway and the keyway mating portion has an opening with a mating generally dovetailed cross-section.

16. An interface for coupling optical fibers to electronic circuitry comprising:
   a base having formed therein a keyway with guide rails having axial alignment means associated therewith;
   a plurality of optical waveguides formed in the base by plastic molding with each waveguide having an optical input/output positioned in a first surface of the keyway, the optical waveguides including a first cladding layer, a second cladding layer affixed in overlying relationship on the first cladding layer, a light conducting core positioned between the first and second cladding layers and substantially surrounded thereby, the core having first and second ends optically accessible at opposite ends of the waveguide, and a first electrical conductor formed in the first cladding layer with an externally accessible contact positioned in an end of the waveguide adjacent the first end of the core and an externally accessible portion positioned on an external surface of the first cladding layer;
   a keyway mating portion formed to slideably engage the key guide rails and axial alignment means to align at least one surface of the mating portion in two orthogonal directions with the first surface of the keyway; and
   a plurality of optical fibers each having one end mounted in the keyway mating portion with the one end of each of the plurality of fibers being positioned to be aligned with one of the input/outputs positioned in the first surface when the mating portion is slideably engaged in the keyway.

17. An interface for coupling optical fibers to electronic circuitry as claimed in claim 16 including in addition a second electrical conductor formed in the second cladding layer with an externally accessible contact positioned in the end of the waveguide adjacent the first end of the core and an externally accessible portion positioned on an external surface of the second cladding layer.

18. An interface for coupling optical fibers to electronic circuitry as claimed in claim 17 wherein the second electrical conductor is a ground plane affixed to the external surface of the second cladding layer and extending to the end of the waveguide.

19. An interface for coupling optical fibers to electronic circuitry as claimed in claim 16 wherein a first portion of the first electrical conductor adjacent the externally accessible contact is embedded in the first cladding layer and the first electrical conductor includes a bend therein extending from the first portion to the externally accessible portion.

20. An interface for coupling optical fibers to electronic circuitry as claimed in claim 19 wherein the bend includes at least one substantially ninety degree angle.

21. An interface for coupling optical fibers to electronic circuitry as claimed in claim 20 wherein the bend includes two substantially ninety degree angles oriented in opposite directions.

22. An interface for coupling optical fibers to electronic circuitry as claimed in claim 16 wherein the optical waveguides include a plurality of cores and a plurality of first electrical conductors, at least one for each core.

23. An interface for coupling optical fibers to electronic circuitry as claimed in claim 22 wherein the plurality of first electrical conductors is a flexible leadframe.

24. An interface for coupling optical fibers to electronic circuitry as claimed in claim 23 wherein the leadframe includes electrical conductors formed of copper.

25. An interface for coupling optical fibers to electronic circuitry comprising:
   a base having formed therein a keyway with guide rails having axial alignment means associated therewith and a plurality of optical waveguides molded in the base with each waveguide having an optical input/output positioned in a first surface of the keyway, the optical waveguides each including a molded cladding layer having a first index of refraction and a channel formed therein with optically transparent material having a second index of refraction at least 0.01 greater than the first index of refraction positioned in the channel of the cladding layer so as to form an optical channel waveguide having a critical internal reflection angle, each of the optical channel waveguides having an exposed surface;
   a transmissive holographic layer with first and second substantially parallel, spaced apart optical input/output surfaces, the holographic layer having a plurality of gratings formed therein so as to substantially extend between the first and second optical input/output surfaces of the holographic layer, and the first optical input/output surface being affixed in overlying relationship to the exposed surfaces of the optical channel waveguides;
   the plurality of gratings being positioned to form an angle with the first and second optical input/output surfaces of the holographic layer such that light rays incident on the second optical input/output surface of the holographic layer and substantially normal thereto are diffracted by a grating into an optical waveguide at an angle, with a transverse axis of the optical channel waveguide, greater than the critical angle of the optical channel waveguide; and
   a keyway mating portion formed to slideably engage the keyway guide rails and axial alignment means to align at least one surface of the mating portion in two orthogonal directions with the first surface of the keyway, the mating portion including a plurality of optical fibers mounted therein with one end of each of the plurality of fibers being positioned to be aligned with one of the input/outputs positioned in the first surface when the mating portion is slideably engaged in the keyway.

26. An interface for coupling optical fibers to electronic circuitry as claimed in claim 25 including in addition an optically transparent layer of material affixed to the second optical input/output surface of the holographic layer, and an electronic device including at least one of a light generator and a light detector fixedly mounted on the optically transparent layer in optical communication with the optical channel waveguides.

27. An interface for coupling optical fibers to electronic circuitry as claimed in claim 25 wherein the plurality of gratings are formed by different indexes of refraction within the holographic layer.

28. An interface for coupling optical fibers to electronic circuitry as claimed in claim 25 wherein the holographic layer includes a photopolymer recording film.

29. An interface for coupling optical fibers to electronic circuitry as claimed in claim 25 wherein the holographic layer includes dichromated gelatin.

30. An interface for coupling optical fibers to electronic circuitry comprising:
   a base having formed therein a keyway with guide rails having axial alignment means associated therewith and a plurality of optical waveguides molded in the base with each waveguide having an optical input/output positioned in a first surface of the keyway, the optical waveguides each including a molded cladding layer having a first index of refraction and a channel formed therein with optically transparent material having a second index of refraction at least 0.01 greater than the first index of refraction positioned in the channel of the cladding layer so as to form an optical channel waveguide, each of the optical channel waveguides having an exposed surface;
   a holographic layer with first and second substantially parallel, spaced apart optical input/output surfaces and the first optical input/output surface being affixed in overlying relationship to the exposed surface of each of the optical channel waveguides, the holographic layer including holographic lenses positioned to focus light rays from within at least one of the optical channel waveguides onto a predetermined external spot; and
   a keyway mating portion formed to slideably engage the keyway guide rails and axial alignment means to align at least one surface of the mating portion in two orthogonal directions with the first surface of the keyway, the mating portion including a plurality of optical fibers mounted therein with one end of each of the plurality of fibers being positioned to be aligned with one of the input/outputs positioned in the first surface of the key when the mating portion is slideably engaged in the keyway.

31. An interface for coupling optical fibers to electronic circuitry as claimed in claim 30 wherein the holographic layer further includes a holographic lens positioned to focus light rays from a predetermined external spot into an optical waveguide.

32. An interface for coupling optical fibers to electronic circuitry as claimed in claim 30 wherein the exposed surface of each of the optical channel waveguides is an end of the optical channel waveguide.

33. An interface for coupling optical fibers to electronic circuitry as claimed in claim 30 including in addition a light generator mounted adjacent the holographic layer and directing generated light rays onto the second optical input/output surface of the holographic layer when the light generator is activated.

34. An interface for coupling optical fibers to electronic circuitry as claimed in claim 33 wherein the light generator is a vertical cavity surface emitting laser.

35. An interface for coupling optical fibers to electronic circuitry as claimed in claim 33 wherein the light generator is a light emitting diode.

36. An interface for coupling optical fibers to electronic circuitry as claimed in claim 30 including in addition a light detector mounted adjacent the holographic layer so as to receive light rays emanating from the second optical input/output surface of the holographic layer.

37. An interface for coupling optical fibers to electronic circuitry comprising:
- a base having formed therein a keyway with guide rails having axial alignment means associated therewith;
- a plurality of optical waveguides formed in the base by plastic molding with each waveguide having an optical input/output positioned in a first surface of the keyway, the optical waveguides including a first cladding layer, a second cladding layer affixed in overlying relationship on the first cladding layer and a light conducting core positioned between the first and second cladding layers and substantially surrounded thereby;
- a keyway mating portion formed to slideably engage the keyway guide rails and axial alignment means to align at least one surface of the mating portion in two orthogonal directions with the first surface of the keyway; and
- a plurality of optical fibers each having one end mounted in the keyway mating portion with the one end of each of the plurality of fibers being positioned to be aligned with and in optical communication with one of the input/outputs positioned in the first surface of the keyway when the mating portion is slideably engaged in the keyway.

* * * * *